United States Patent [19]

Kitamoto

[11] Patent Number: 5,344,730
[45] Date of Patent: Sep. 6, 1994

[54] METHOD OF RECORDING INFORMATION ON A PHOTOGRAPHIC FILM

[75] Inventor: Tatsuji Kitamoto, Kanagawa, Japan

[73] Assignee: Fuji Photo Film Co., Ltd., Kanagawa, Japan

[21] Appl. No.: 82,906

[22] Filed: Jun. 29, 1993

Related U.S. Application Data

[63] Continuation of Ser. No. 845,055, Mar. 3, 1992, abandoned.

[30] Foreign Application Priority Data

Mar. 13, 1991 [JP] Japan .................................. 3-048116

[51] Int. Cl.5 .............................................. G03C 1/76
[52] U.S. Cl. ...................................... 430/14; 430/496; 430/501; 430/140; 354/76; 354/106
[58] Field of Search ............... 430/496, 501, 14, 140; 354/105, 106, 109, 75, 76, 21; 360/48, 51

[56] References Cited

U.S. PATENT DOCUMENTS 4,503,135 3/1985 Drexler ................................ 430/496
4,860,037 8/1989 Harvey ................................ 354/105
4,977,419 12/1990 Wash et al. .......................... 354/76
5,187,511 2/1993 Amano ................................ 354/106

FOREIGN PATENT DOCUMENTS 9004205 4/1990 World Int. Prop. O. .

Primary Examiner—Charles L. Bowers, Jr.
Assistant Examiner—Mark F. Huff
Attorney, Agent, or Firm—Sughrue, Mion, Zinn, Macpeak & Seas

[57] ABSTRACT

A method of recording information relating to an image photographed on a photographic film in which the photographic film comprises a magnetic track associated with each image frame for magnetically recording the information. Each magnetic track has two or more fields. The information is divided into sections which are each recorded onto any of the fields together with a start signal, an end signal, and an error detection and/or correction signal for each the information section. Consequently, even if the information to be recorded for each image frame is interrupted due to an error in the conveying speed of the film, a portion of the information can be read and utilized.

21 Claims, 9 Drawing Sheets

METHOD OF RECORDING INFORMATION ON A PHOTOGRAPHIC FILM

This is a continuation of application No. 07/845,055, filed Mar. 3, 1992, now abandoned.

BACKGROUND OF THE INVENTION

1. Field of the Invention

The present invention relates to a method of recording information on a photographic film in which an image to be photographed may be optically recorded on an emulsion surface which is applied to a base of the photographic film.

2. Description of the Related Art

Conventionally, there has been proposed a method in which a transparent magnetic material is applied on a photographic film, and in particular, a negative or positive film, to magnetically record information relating to the negative film and information relating to an image recorded on the negative film (see, for example, International Publication No. WO 90/04205). According to this method, the information can be stored on a magnetic track formed of the transparent magnetic material and corresponding to each image frame. Information to be recorded for each image frame includes: frame number, sensitivity, photographing date, indication of pseudo-zooming/panorama photographing, counterlight/underexposure or overexposure, indication of use of a stroboscope, color temperature, shutter speed, aperture, distance of object(s) photographed, orientation of camera during photographing, place photographed, name of object(s) photographed and other memos relating to the shot.

If such information can be obtained for each photographic frame, the user can readily put the photos in order, store them, retrieve them, or the like. In addition, when a color print is to be obtained from the film photographed by the negative film, since information such as the indication of the pseudo-zooming/panorama, photographing in the counter-light/underexposure or overexposure, use of the stroboscope, the color temperature, or the like are available, it is possible to obtain prints intended during photographing.

In addition, in a film processing laboratory, it is possible to record the amount of exposures for three colors and the like set for the printing for each image frame when the image is printed on photographic paper. At the time of reordering additional prints, this recorded information, such as amount of exposures for three colors and the like, is read, so as to allow the additional prints to be consistent in quality with the original prints.

Incidentally, unlike conventional magnetic tapes, the negative film is intermittently fed frame by frame. However, recording of the information should be conducted when the negative film is being conveyed at a constant speed. In order to relax this constant speed limitation a method called the "three-part code" is proposed in the above-described International Publication No. WO 90/04205.

The three-part code has a timing pulse at the start and end of bit cells in order to represent "0" and "1" of a digital binary signal, the bit cell is divided into two parts to record 0 at the front half and 1 at the latter half or vice versa. If this code is used, then even if the film feeding speed fluctuates somewhat, there is less possibility to make an error in reading "0" and "1".

Further, when the information is actually recorded, the information is coded in terms of "0" and "1" and recorded. digitally. Together with the information a start signal indicating the start of the information, an end signal indicating the end of the information, and at least one of an error detection signal and an error correction signal for preventing errors in digital recording are recorded.

In the above-described Publication, in the simplest error detection signal, a parity check bit is added to yield an even number when a series of data bits are summed rip. For a more sophisticated example of coding method of detecting and correcting errors, a detailed description can be found in items 3. 2. 13. CRC and 3. 2. 14. ECC of ISO/IEC DF 10089-2, concerning a rewritable disk. Such a parity check bit, error detecting code or error correcting code are integral parts of the information recorded and without these data information cannot be reliably read. In general, the recording area for this error detection signal and/or error correction signal comes immediately after the end signal, that is, immediately after a series of information signals.

The start and the end of the information for each image frame can be recognized according to the start signal indicating the start of information, the end signal indicating the end of information, and the error detection signal and/or error correction signal which are essential to write and read correctly with their error preventing capability. These signals make up the total information and make the information writing/reading reliable.

However, if the increase in the conveying speed of the negative film within the camera is too slow, then the negative film may be late in reaching a predetermined speed, and the recording area can become deficient. On the contrary, the negative film may be conveyed faster than the predetermined speed, so that the conveying of a single image frame is finished before the information to be recorded has been recorded. In such a case, the end signal and the error detection signal and/or error correction signal are not recorded, and because these signals are integral parts of the total information, information regarding the image frame can be lost.

SUMMARY OF THE INVENTION

In view of the above-described facts, it is an object of the present invention to provide a photographic film and a method of recording information on the photographic film which allow a recorded part of the information to be utilized even if the recording of the information to be recorded for each image frame is not completed.

In order to achieve the above-described purpose, a specific embodiment of the photographic film of the present invention in which an image to be photographed comprises: a plurality of image frames, and a recording portion provided for each image frame for recording information regarding the image frame, the recording portion including two or more fields running along the film conveying direction, each of two or more information sections are obtained by dividing the information, which includes at least a start signal and an end signal and an error detection signal and/or an error correction signal for each divided information fields and can be recorded on either one of the above-mentioned fields.

In the photographic film as arranged above, the information regarding the image frame is divided into two or more sections. For each section, the start signal, the end signal, and the error detection signal and/or error correction signal for the information are provided and recorded. Consequently, even if a part of the information sections is not recorded completely and can not be read, it is possible to reliably read the information from the other information sections.

Further, the above-described recording portion can be constituted by at least one magnetic track. In this case, reading and writing is easy. Rewriting can also be easily carried out, and the amount of information that can be recorded can also be increased.

In addition, another embodiment of the photographic film according to the present invention comprises, a base, an emulsion layer provided on one surface of the base and on which a photographed image is optically recorded, a substantially transparent magnetic recording layer provided on the other surface of the base and on which information is magnetically recorded, and a plurality of magnetic tracks formed on the magnetic recording layer and running parallel to the longitudinal direction of the film, the tracks each including two or more fields running along the conveying direction of the film, each of two or more information sections, obtained by dividing the information, provided with at least a start signal, an end signal and an error detection signal and/or an error correction signal for the information and capable of being recorded on either one of the fields.

In the photographic film as arranged above, the information regarding the image frame is divided into two or more sections. For each section, the start signal, the end signal, and the error detection and/or correction signal are provided and magnetically recorded. Therefore, even if a part of the information sections is not recorded accurately and cannot be read, it is possible to reliably read the other information sections. In addition, because of the magnetic recording, reading and writing is easy. Rewriting can also easily be carried out, and the amount of information which can be recorded can be increased.

In addition, a method of recording information according to the present invention is a method of recording information on a photographic film in order to record information regarding each image frame onto a recording portion provided for each image frame of the photographic film, on which the photographed image is optically recorded, comprising steps of: dividing the information to be recorded on the recording portion into two or more information sections, and recording each of the above-described information sections together with at least a start signal and an end signal for the information while the film is being conveyed. Further, each of the information sections may be provided with an error detection signal and/or correction signal for the information.

According to the above-described recording method, the information to be recorded regarding a single image frame is divided into two or more information sections. Each of the information sections is recorded, as well as the start signal, the end signal and the error detection and/or correction signal. Consequently, even if the increase in the conveying speed of the photographic film, which is necessary to record the information, is delayed and a part of the information sections cannot be recorded, other information sections can be reliably recorded. In addition, since for each information section, the above-described start signal and other signals are provided, the recorded information can be reliably read.

In addition, if the conveying speed of the film is faster than a predetermined conveying speed, a part of the information sections cannot be recorded, as in the case described above, but the other information sections can be reliably recorded.

Here, if any one of the above-described problems occurs, since the area where the information cannot be recorded coincides with the rear portion of the film as viewed in the direction in which the film is conveyed, it is preferable to record the more important information sections on the front portion of the film as viewed in the direction in which the film is conveyed. Consequently, even if there is an error in conveying the film, since the important information is reliably recorded, there is no deterioration in the performance of the photo processing system.

The recording portion may be constituted by a magnetic track. In this case, reading and writing is easy. Rewriting can also easily be carried out. In addition, the amount of information which can be recorded can also be increased.

As described, above, the method of recording information on the photographic film according to the present invention is advantageous in that, even if the recording of information for each image frame is interrupted, part of the information can be read and utilized.

DETAILED DESCRIPTION OF THE PREFERRED EMBODIMENT

Figure 1:
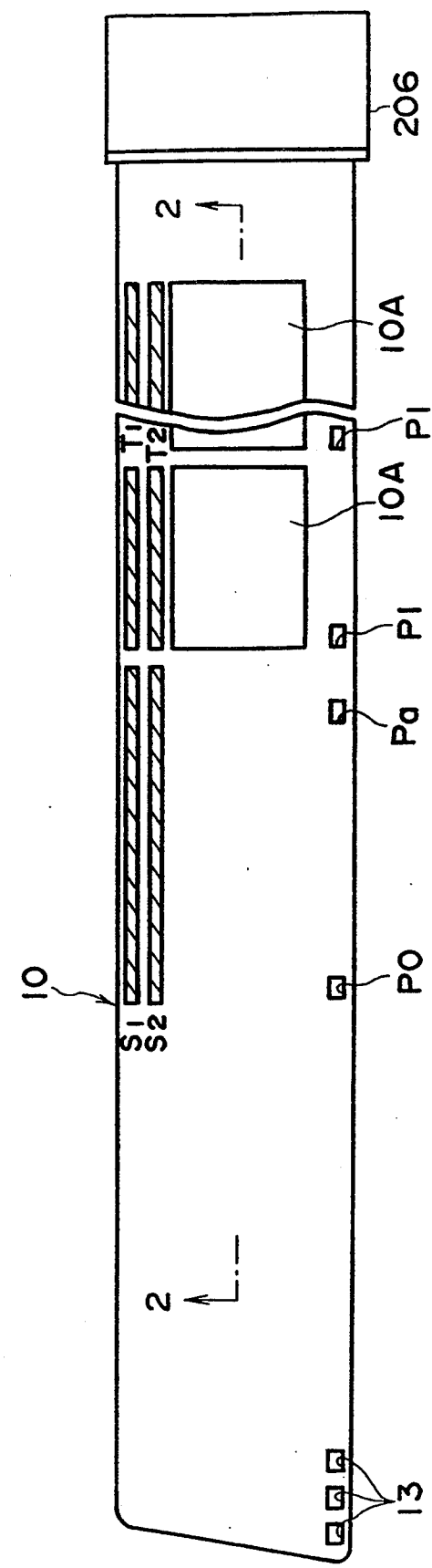
FIG. 1 is a plan view of a negative film according to an embodiment of the present invention.
Figure 2:
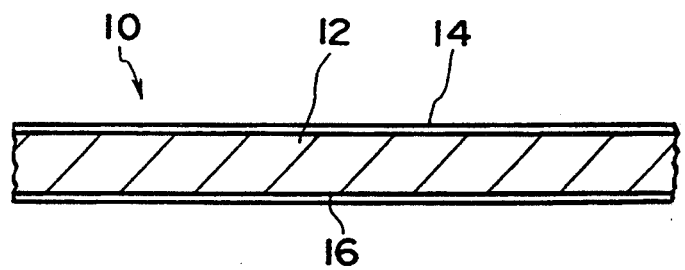
FIG. 2 is a cross-sectional view taken along line 2—2 of FIG. 1.

FIGS. 1 and 2 illustrate a negative film 10 according to the present invention, in which an emulsion layer 14 is provided on the upper surface of a transparent base 12 so that an image may be exposed and photographically recorded on the emulsion layer 14. In addition, on the lower surface of the transparent base 12 of FIG. 2, a transparent magnetic recording layer 16 including a magnetic material is provided. This magnetic recording layer 16 is provided outside of the area of an image frame 10A of the negative film 10 or over the entire surface of the film. As illustrated in FIG. 1, tracks S1 and S2 are each formed at the front end portion of the negative film 10, where no image frame 10A is recorded, and tracks T1 and T2 are each formed at positions corresponding to each image frame 10A, so that all the tracks extend along the longitudinal direction of the negative film 10. Perforation P0 is provided at a position corresponding to the forward end positions of the tracks S1, S2. Perforations P1 are provided at the portions corresponding to the forward end portions of the respective image frames. In addition, at the front end portion of the negative film 10, a plurality of perforations 13 is provided for engaging the negative film 10 with the teeth of a sprocket (not shown) for withdrawal from a cassette.

Tracks S1, S2 are each areas for recording necessary information of each roll of the negative film 10. Tracks T1, T2 are each areas for recording necessary information of each image frame 10A. In this embodiment, a perforation Pa is provided at a position corresponding to the intermediate portions of the tracks S1. This perforation Pa is provided corresponding to the front position of a camera input area 44 (see FIG. 3) of the information recorded on the track S1 which will be described later. That is, for the track S1, since the information recorded during photographing is recorded only on the above-described camera input area 44, its recording start position is indicated by the perforation Pa. In addition, this perforation Pa may be detected by photoelectric sensors 207, 235, and. 239 (see FIGS. 8 and 9), which are provided in a camera 200 and a photo printing apparatus 202, which will be described later.

Each track of the above-described magnetic recording layer 16 is divided into an area where data is entered during manufacturing of the negative film 10, an area where data is entered by the photographing camera, an area where data is entered at a DPE shop (where the user drops off film for development), an area where data is entered at a laboratory and an area where data can be freely entered by the user. These areas are hereinafter described in detail.

Track S1

Figure 3:
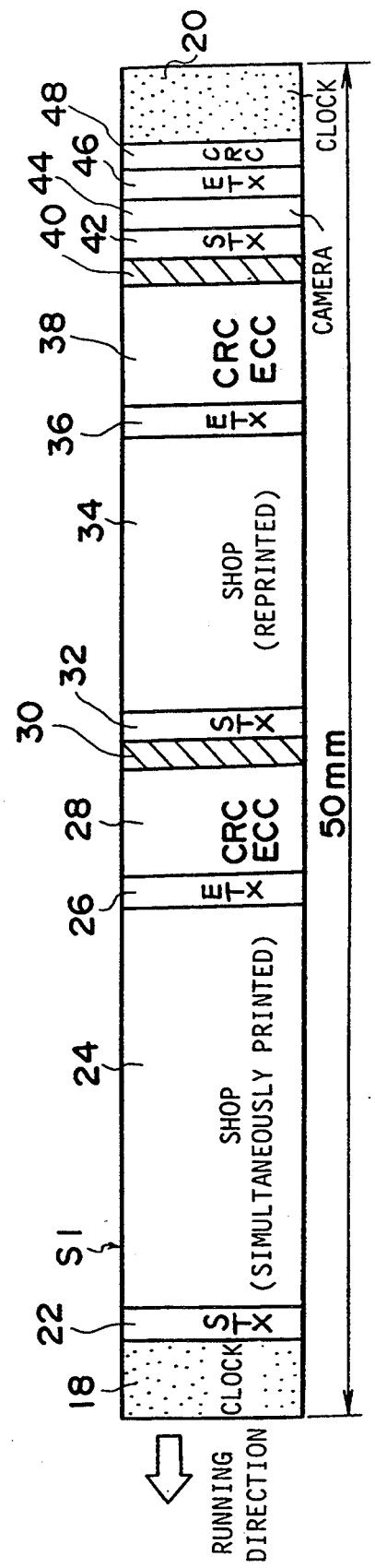
FIG. 3 is a plan view illustrating an area of track S1 for a magnetic recording layer.

As illustrated in FIG. 3, the entire length of the track S1 according to the present invention is 50 mm. 3 mm of its front end and 3 mm of its terminal end are each set to clock areas 18, 20 where a clock signal is recorded. The clock areas 18, 20 are used to check for conveyance and, in particular, the conveying speed of the negative film 10. Following the clock area 18, a first STX area 22 where the start signal is recorded, a DPE input area 24 where information is recorded at a DPE shop where the user orders the development of the photographed negative film 10, a first ETX area 26 where the end signal is recorded, and a CRC/ECC area 28 where a first error detection and/or error correction signal are/is recorded are set. A first blank portion 30 is then set, followed by a second STX area 32, a second DPE input area 34, a second ETX area 36, and a second CRC/ECC area 38. In addition, a second blank portion 40 is set, followed by a third STX area 42, the camera input area 44, a third ETX area 46, and a third CRC/ECC area 48 are set so as to continue to the above-described clock area 20 at the terminal end.

Track S2

Figure 4:
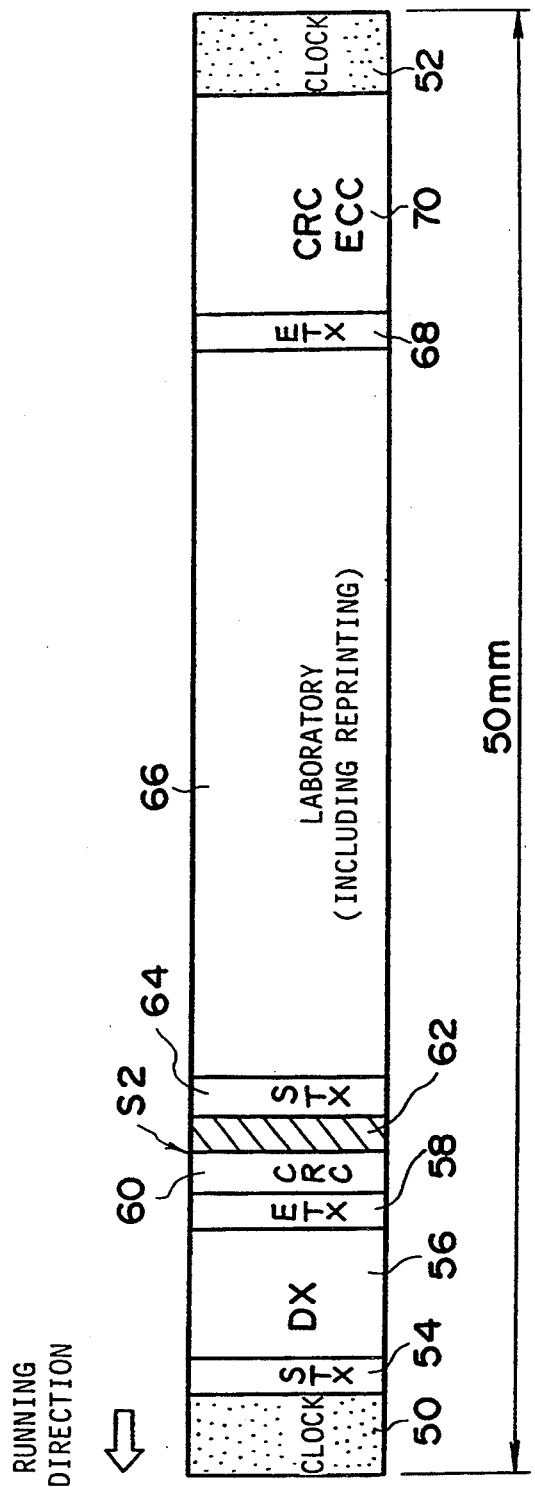
FIG. 4 is a plan view illustrating an area of track S2 for the magnetic recording layer.

Next, as shown in FIG. 4, the entire length of the track S2 is 50 mm, and with a standard winding speed, about 3 mm of its front end and 3 mm of its terminal end are each set to clock areas 50, 52 on which a clock signal is recorded. Following the clock area 50, is a first STX area 54, a DX area 56 where a DX code is entered, a first ETX area 58, and a first CRC/ECC area 60. A blank portion 62 is followed by a second STX area 64, a laboratory input area 66, a second ETX area 68, and a second CRC/ECC area 70 so as to continue to the above-described clock area 52 at the terminal end of track S2.

Track T1

Figure 5:
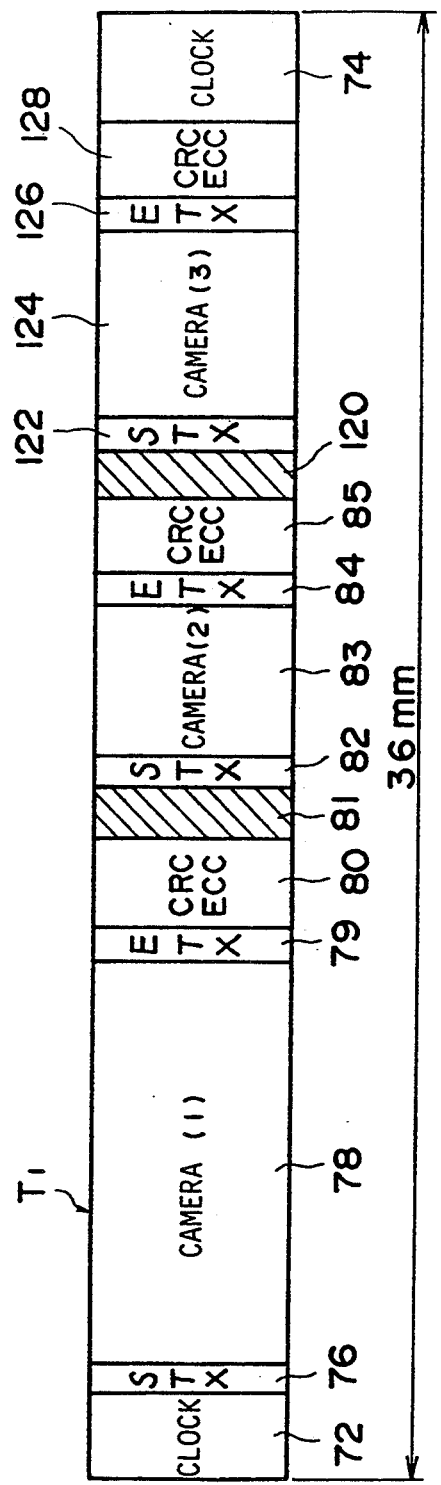
FIG. 5 is a plan view illustrating an area of track T1 for the magnetic recording layer.

As shown in FIG. 5, the entire length of the track T1 is 36 mm, the same as that of the image frame 10A as viewed in the longitudinal direction thereof. About 3 mm of its front end and 3 mm of its terminal end are each set to clock areas 72, 74 where a clock signal is recorded. Following the clock area 72, are a first STX area 76, a first camera input area 78, a first ETX area 79, and a first CRC/ECC area 80. A first blank portion 81 is followed by a second STX area 82, a second camera input area 83, a second ETX area 84, and a second CRC/ECC area 85. Further, a second blank portion 120 is followed by a third STX area 122, a third camera input area 124, a third ETX area 126, and a third CRC/ECC area 128 so as to continue to the above-described clock area 74 at the terminal end track T2.

Track T2

Figure 6:
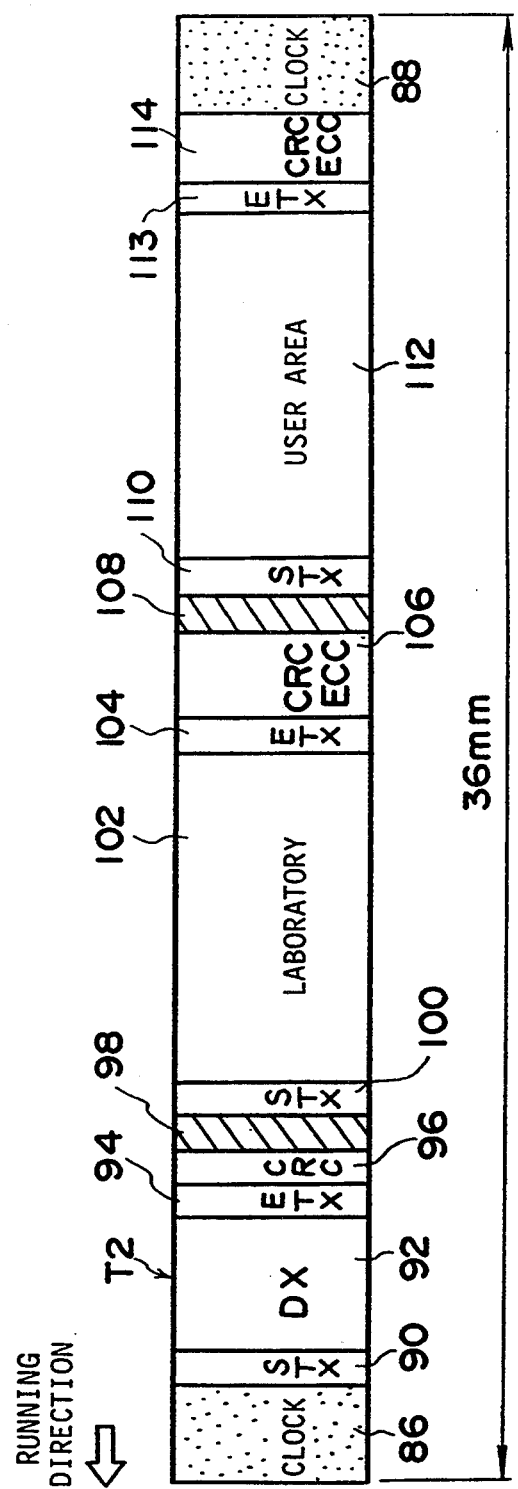
FIG. 6 is a plan view illustrating an area of track T2 for the magnetic recording layer.

As shown in FIG. 6, the entire length of the track T2 is 36 mm, the same as that of the above-described track T1. About 3 mm of its front end and 3 mm of its terminal end are each set to clock areas 86, 88 where a clock signal is to be recorded. Following the clock area 86, is a first STX area 90, a DX area 92, a first ETX area 94, and a first C1RC/ECC area 96. A first blank portion 98 is followed by a second STX area 100, a laboratory input area 102, a second ETX area 104, and a second CRC/ECC area 106. In addition, a second blank portion 108 is followed by a third STX area 110, a user input area 112, a third ETX area 113, and a third CRC/ECC area 114 so as to continue to the above-described clock area 88 at the terminal end of track T2.

Figure 7:
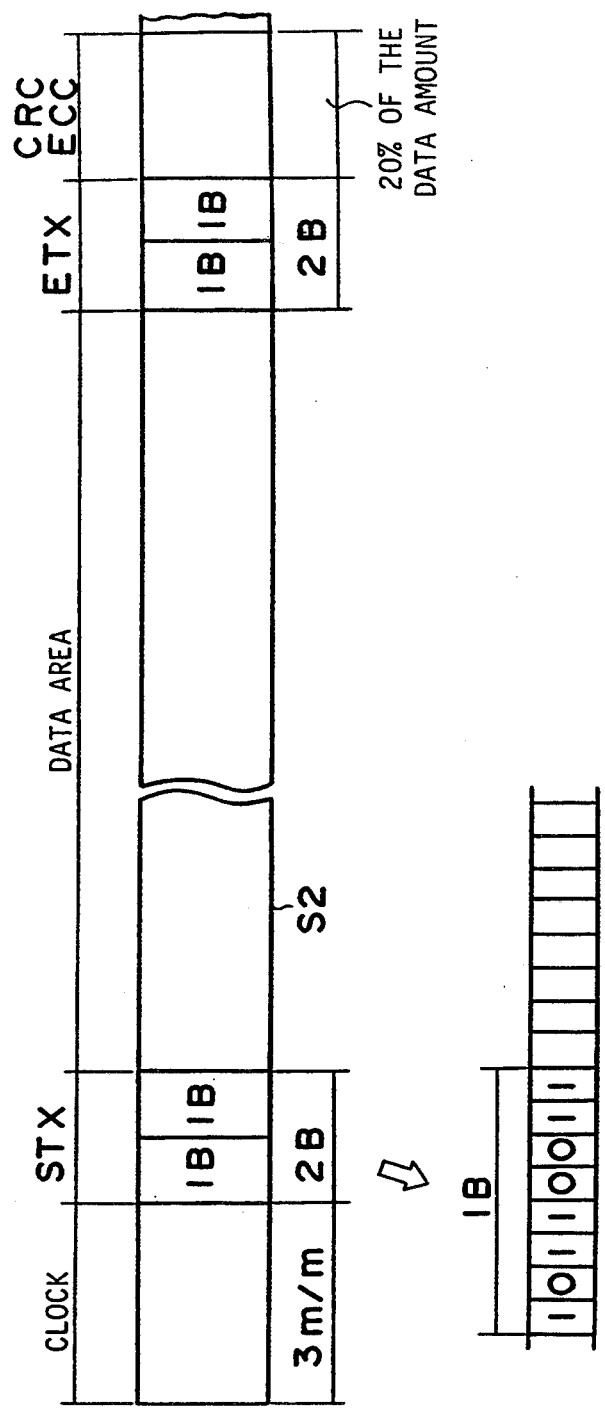
FIG. 7 is a schematic view illustrating the width of an area of each track.

When the information is recorded on each track of the magnetic recording layer 16, as shown in FIG. 7, a single character may be represented by binary data, that is, a combination of "1" and "0". Incidentally, one character is an eight-bit (one byte) ASCII code.

As shown in FIG. 3, the first STX area 22 and the first ETX area 26 of the track S1 are each set to areas where two-bytes of data can be recorded. In addition, the first CRC/ECC area 28 is set to 20% of the size of the data area (for the track S1, the DPE area 24).

On the track S2 of the negative film 10 formed as described above, the lot number is entered in advance in the non-photographed condition, that is, at the production stage, as shown in Table 1, binary form according to the above-described eight-bit ASCII code. In addition, on the track T1, as shown in Table 1, ISO sensitivity, designation of negative or positive, the number of frames, the name of the maker, and the frame numbers are entered in advance binary form according to the above-described eight-bit ASCII code.

TABLE 1

| Input Information | Content of Input Information | Input Method | Input Position |  |
|---|---|---|---|---|
|  |  |  | Frame | per Film |
| Previously Input |  |  |  |  |

TABLE 1-continued

| Input Information | Content of Input Information | Input Method | Input Position Frame | per Film |
|---|---|---|---|---|
| onto the film | | | | |
| 1. ISO sensitivity | ISO 25 to 6400 | pre-input | ☆ | |
| 2. Negative/Positive | neg./pos. | " | ☆ | |
| 3. Number of films | 12, 24, 36 exp. | " | ☆ | |
| 4. Maker | FF, EK etc. | " | ☆ | |
| 5. Frame No. | 1 to 36 | " | ☆ | |
| a. Lot No. | 123456 | " | | ★ |

As described above, since the camera input area, the DPE input area, and the laboratory input area are all included at the information area where the information is recorded on each track of this embodiment, the STX area, the ETX area and the CRC/ECC area are each provided for each information area. As a result, the information for each track becomes independent of the information of the other tracks.

Figure 8:
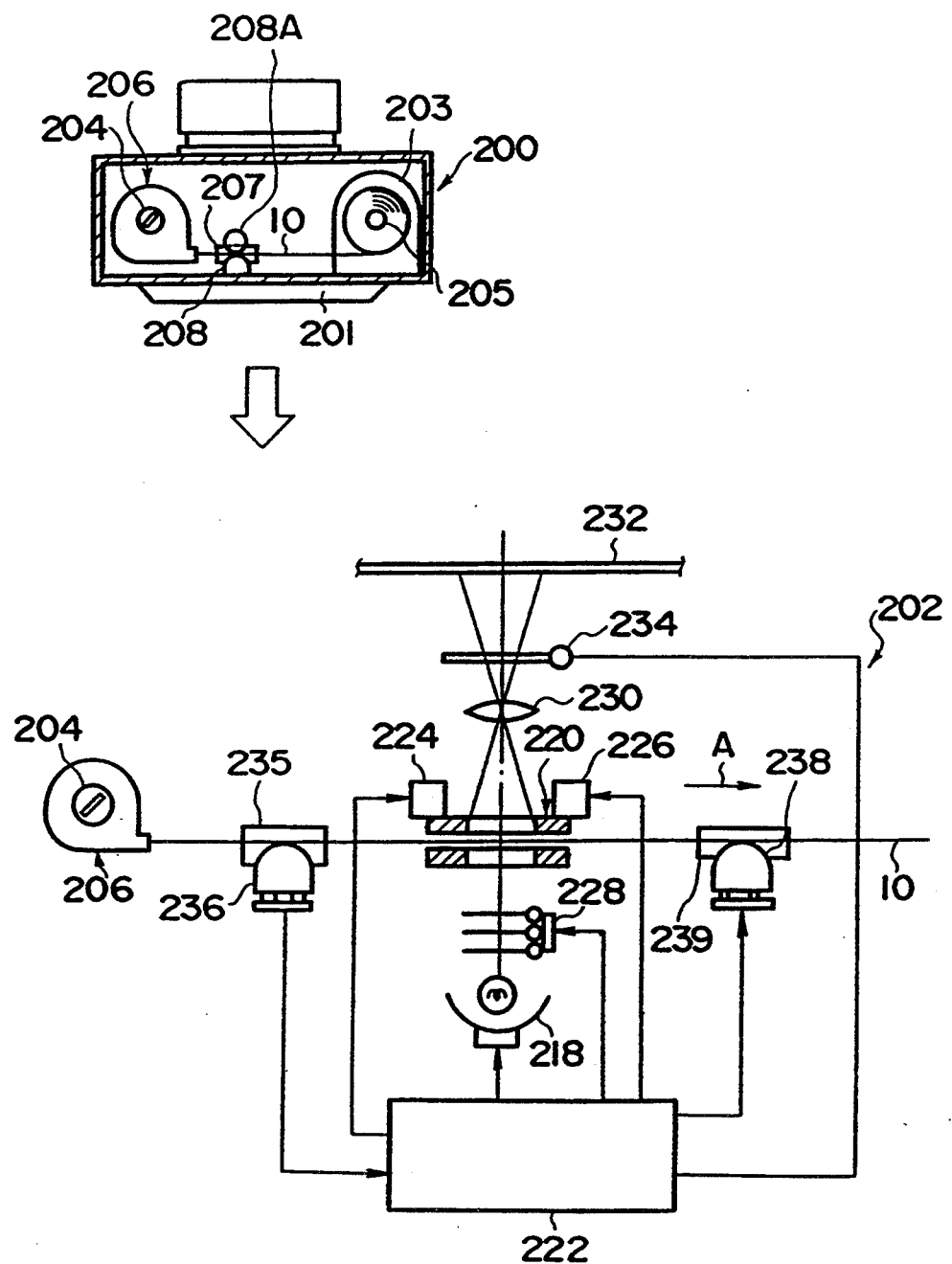
FIG. 8 is a view of a system for recording and playing back information according to the embodiment of the present invention.

FIG. 8 illustrates the camera 200 and the photo printing apparatus 202 according to this embodiment. In one side of the camera 200, a cartridge 206 for winding and accommodating the negative film 10 about a spool 204 is loaded. Within the camera 200, there is provided a driving reel 205 which is driven by a motor 203 connected to a control portion 201 (see FIG. 10). When the front end of the negative film 10 is engaged with this driving reel 205, the negative film 10 is fed frame by frame.

Within the camera 200, a recording head 208 connected to the control portion 201 is provided corresponding to each track of the magnetic recording layer 16 of the negative film 10 so that predetermined information regarding the exposed and recorded image may be automatically recorded on the above-described tracks as the negative film 10 is conveyed by the above-described driving means (see Table 2).

TABLE 2

| Input Information | Content of Input Information | Input Method | Input Position Frame | per Film |
|---|---|---|---|---|
| Input by camera | | | | |
| 6. Date | month, day, 19– | automatic | ☆ | |
| 7. Time | hour, min | " | ☆ | |
| 8. Photographed | how much was photographed | " | ☆ | |
| 9. PZ magnification, P | 2 X (10 steps) | " | ☆ | |
| 10. Stroboscope | yes or no | " | ☆ | |
| 11. Fluores. lamp | light amount | " | ☆ | |
| 12. Color temp. | color temp. | " | ☆ | |
| 13. Shutter SP | B to 1/5000 | " | ☆ | |
| 14. Focusing | M to ∞ | " | ☆ | |
| 15. F value | | " | ☆ | |
| 16. Orientation of camera | longitudinal or lateral photographing | " | ☆ | |
| b. Type of camera | FUJICA 700 | " | | ★ |
| c. L focal length | 10 to 1000 | " | ☆ | |
| d. Backlight photographing | backlight | " | ☆ | |
| e. O, U photograph | over, under | " | | ★ |
| f. Prewind | prewind | " | | |
| 17. Number of simult. prints specified | 1 to 16 | manual | ☆ | |
| 18. Title | 10 characters | " | ☆ | |
| g. Key word | 10 characters | " | | ★ |
| h. Auxiliary input | | " | | ★ |

TABLE 2-continued

| Input Information | Content of Input Information | Input Method | Input Position Frame | per Film |
|---|---|---|---|---|
| i. Title | 10 characters | " | | ★ |
| j. Photo. place | 10 characters | " | | ★ |
| k. Photographer | 10 characters | " | | ★ |
| l. Object | 10 characters | " | | ★ |
| m. Serial number | 1 to 1000 | " | | ★ |
| n. Retrieval key word | 10 characters | " | | ★ |

Incidentally, this recording of information is carried out while the negative film 10 is being conveyed at a speed greater than a predetermined speed or at a constant speed. That is, since the negative film 10 is fed frame by frame, a rising time and a trailing time are required for each frame conveying. The range which can be used for recording in each frame conveying accounts for about 80% of the entire amount which is conveyed.

A photoelectric sensor 207 is provided in the camera 200 on the path along which the negative film 10 is conveyed.

Figure 9:
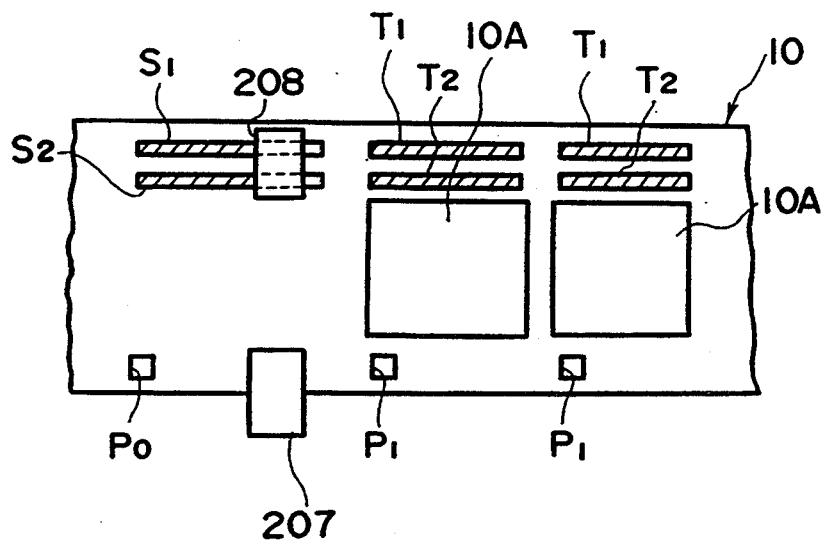
FIG. 9 is a plan view illustrating a relative positional relationship between a recording head and a photoelectric sensor in a negative film loaded into a camera of the embodiment of the present invention.

As shown in FIG. 9, the photoelectric sensor 207 is provided so as to be offset from the recording head 208, as measured in the longitudinal direction of the negative film, an amount which coincides with the amount of offset between the actual front position of the camera input area 44 of the track S1 and the perforation Pa (the amount of offset according to this embodiment is zero).

Figure 10:
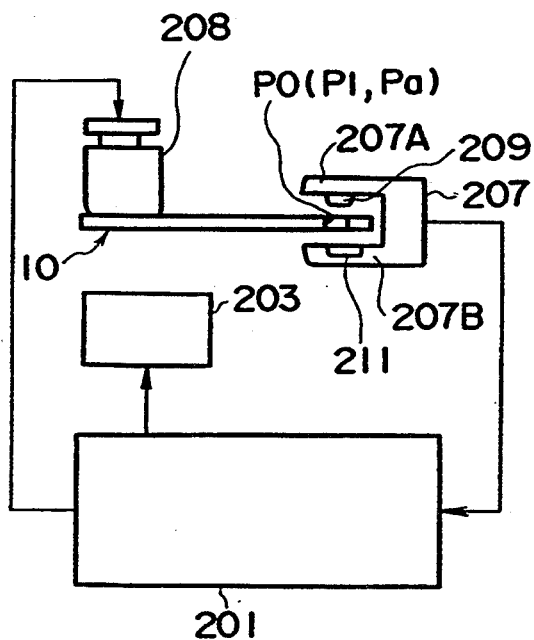
FIG. 10 is a schematic block diagram of a camera according to the embodiment of the present invention.

As shown in FIG. 10, this photoelectric sensor 207 corresponds to a path along which the above-described perforations P0 and P1 are provided, and is provided with a pair of leg portions 207A and 207B straddling the front and back surfaces of the negative film 10. On one of the leg portions 207A, a light projecting portion 209 is mounted so as to illuminate the negative film 10 with light beams. Incidentally, it is preferable that infrared ray be used in this arrangement in order to prevent the negative film 10 from being exposed by the light. In addition, on the other leg portion 207B, a light receiving portion 211 is mounted. When light beams from the light projecting portion 209 are received, the photoelectric sensor 207 emits a high level signal to the control portion 201.

Here, since the negative film 10 is conveyed between the light projecting portion 209 and the light receiving portion 211, the high level signal is emitted only when the perforations P0 and P1 pass therebetween. When the high level signal from the photoelectric sensor 207 is entered in the control portion 201 and the speed at which the negative film 10 is conveyed exceeds a predetermined value, the recording head 208 is controlled to record the above-described information.

The latter speed condition is due to the need for the recorded information to be stored within the range of a frequency band of a recording circuit which includes the recording head. The speed at which the negative film 10 is conveyed is detected by the rpm of a back-up roll 208A, which presses the negative film 10 against the rear side of the head of FIG. 8 while rotating in contact with the film 10. When the speed at which the negative film 10 is conveyed approaches the predetermined speed, recording of only the timing signal for the synchronized signal portion is started. When the speed at which the negative film 10 is conveyed attains the predetermined speed, the information sections following STX are recorded.

After being rewound around the cartridge 206, the negative film 10 which has been photographed is taken out of the camera 200 and is brought to the DPE shop. At the DPE shop, a leader portion of the negative film 10 (the portion where the tracks S1 and S2 are provided) is taken out of the cartridge 206 which is in a black box. After the information shown in Table 3 is entered based on the user's order, the cartridge 206 is transported to the laboratory, where, after the negative film 10 is developed, the cartridge 206 is disposed at a predetermined position of the photo printing apparatus 202.

TABLE 3

| Input Information | Content of Input Information | Input Method | Input Position Frame | per Film |
|---|---|---|---|---|
| Input in the shop | | | | |
| 19. User ID | XK-123456 | shop machine | | ★ |
| 20. Shop ID | MA-65421 | shop machine | | ★ |
| 21. Type of negative | F, E, K | shop machine | | ★ |
| 22. Print size | E, L, 2L ... | shop machine | | ★ |
| 23. Kind of surface | glossy, etc. | shop machine | | ★ |
| 24. Number of photos | each 1 to 8 | shop machine | | ★ |
| 25. Simult/IP/neg. printing | simult/ reprint/ only neg. developing | shop machine | | ★ |
| o. User tel. | oooo-oooo | shop machine | | ★ |
| p. Receipt date | month, day 19-- | shop machine | | ★ |
| q. Delivery date | month, day 19-- | shop machine | | ★ |

In the photo printing apparatus 202, a negative carrier 220 is disposed along the optical axis of a light source 218 illuminating the negative film 10 during printing. At the negative carrier 220, a driving roller (not shown) is disposed. The driving roller is rotated by the driving force of the driving portion 224 connected to the control unit 222 so that the negative film 10 may be conveyed in the direction of arrow A of FIG. 8. In addition, at the negative carrier 220, a solenoid 226 is provided so that the negative film 10 may be sandwiched under pressure at the printing position in accordance with the signal from the control unit 222.

CMY filters 228 are interposed between the light source 218 and the negative carrier 220 to appear on and disappear from the optical axis according to the amount of exposure of each color.

The light which passes through the negative film 10 are illuminated onto photographic paper 232 via a lens 230 so that an image may be printed onto the photographic paper 232. Incidentally, a shutter 234 is interposed between the photographic paper 232 and the lens 230 and is retracted from the optical axis in accordance with a signal from the control unit 222 at the time of exposure.

Upstream of the negative carrier 220, which is present on the path along which the negative film 10 is conveyed, a reading head 236 is disposed to read the information recorded by the recording head 208 of the camera 200. In the control unit 222, a memory is provided to record the information read by the reading head 236.

Here, corresponding to the reading head 236, a photoelectric sensor 235 having the same arrangement as that of the photoelectric sensor 207 installed in the camera 200 is provided.. Therefore, the front position of each track can be recognized in accordance with the detection signal of the photoelectric sensor 235.

In addition, downstream of the negative carrier 220, a recording head. 238 is disposed to record onto the negative film 10 the information (shown in Table 4) obtained as the printing is performed by the photo printing apparatus 202.

Here, corresponding to the recording head 238, a photoelectric sensor 239 of the same arrangement as that of the photoelectric sensor 207 installed in the camera 200 is provided. Therefore, the front position of each track can be recognized in accordance with the detection signal of the photoelectric sensor 239.

TABLE 4

| Input Information | Content of Input Information | Input Method | Input Position Frame | per Film |
|---|---|---|---|---|
| Entered in the Lab. | | | | |
| r. Reception time | -- o'cook | shop machine | | ★ |
| s. Charge unit | --- yen | shop machine | | ★ |
| t. Method of payment | cash, credit | shop machine | | ★ |
| u. Special specifications | trim, etc. | shop machine | | ★ |
| 26. Name of lab. | FC-13579 | lab. machine | | ★ |
| 27. Printer | FAP-9000 | lab. printer | | ★ |
| 28. Printing conditions | density, color, F | lab. printer | | ☆ |
| v. Reception date | month, day, 19-- | lab. machine | | ★ |
| w. Process lot No. | 123 | lab. machine | | ★ |
| x. Paper type | A-1284 | lab. machine | | ★ |
| y. Process type | CN-41 | lab. machine | | ★ |

Incidentally, at the DPE shop, the information shown in Table 5 is also entered on the developed negative film 10, whose developing process was completed in the laboratory. The developed negative film 10 can be handle under light at this time.

TABLE 5

| Input Information | Content of Input Information | Input Method | Input Position Frame | per Film |
|---|---|---|---|---|
| Input in the shop or by TV player | | | | |
| 29. Frame No. | 1 to 36 | shop machine | | ★ |
| 30. Number of photos | 1 to 100 | shop machine | | ★ |
| 31. Print size | E, L, 2L ... | shop machine | | ★ |
| 32. Kind of surface | glossy, etc. | shop machine | | ★ |
| z. User ID | XK-123456 | shop machine | | ★ |
| A. Shop ID | MA-654321 | shop machine | | ★ |
| B. User tel No. | oooo-oooo | shop machine | | ★ |
| C. Reception date | month, day 19-- | shop machine | | ★ |

TABLE 5-continued

| Input Information | Content of Input Information | Input Method | Input Position Frame | per Film |
|---|---|---|---|---|
| D. Delivery date | month, day, 19-- | shop machine | | ★ |
| E. Delivery time | -- o'clock | shop machine | | ★ |
| F. Charge unit | --- yen | shop machine | | ★ |
| G. Method of payment | cash, credit | shop machine | | ★ |
| H. Special Specifications | trim, etc. | shop machine | | ★ |

The operation of this embodiment is hereinafter described.

When the negative film 10 is loaded into the camera 200, the perforations 13 at the front end of the negative film 10 engage with the driving real 205. The motor 203 is driven, and the negative film 10 is withdrawn from the cartridge 206. At this time, the perforations P0 and P1 are detected by the photoelectric sensor 207 so that the information may be reliably recorded onto the predetermined area.

When an image is photographed by the camera 200, as the negative film 10 moves, the information ranging from item 6 to item 17 of Table 2 is recorded from the recording head. 208 onto the camera input area 78 of the track T1 corresponding to the photographed image frame 10A.

When the photographing by the camera 200 is ended, the negative film 10 which is rewound around the spool 204 of the cartridge 206 is brought into a DPE shop by the user. There, the negative film 10 is withdrawn from the cartridge 206 in a dark room, and the information shown in Table 3 is recorded onto the DPE input area 24 of the track S1.

The negative film 10 received at the DPE shop is transported to the laboratory to be developed. Subsequently, if the negative film 10 is simultaneously printed, the cartridge 206 is loaded into a predetermined position in the photo printing apparatus 202. When the negative film 10 is withdrawn from the cartridge 206 and is conveyed by the driving portion 224 of the negative carrier 220, the information, which is recorded on the magnetic recording layer 16 by the recording head 208 of the camera 200 and the recording unit in the DPE shop, is read by the reading head 236.

In the laboratory, printing conditions such as the amount of exposure are set based on the information which was read, and each image frame 10A is sequentially positioned at the printing position in order to be printed. Here, while the negative film 10 is being conveyed, the information other than item 28 of Table 4 is recorded onto the laboratory input area 66 of the track S2 which is provided at the front end portion of the negative film 10, by the recording head 238 disposed downstream of the negative carrier 220.

In addition, the information for item 28 of Table 4 (density correction value, color correction value and the like during the printing) is recorded on the laboratory input area 102 of the track T2 of each image frame 10A.

Here, in the process of examining the finished state of the printed photographic paper 232, for example, if it is determined that one of the image frames on the printed photographic paper 232 is of low quality, the image frames 10A corresponding thereto should be reprinted.

However, if the frame number and the correction value of the image frame 10A to be reprinted on the negative film 10 are recorded at this time on each of the laboratory input areas 66, 102 of the above-described track $2 or track T2, the photo printing apparatus 202 can carry out the optimal reprinting processing by only reading this reprinting information.

The developed negative film 10 and the photographic paper 232 developed after printing are returned to the DPE shop. There, the information represented in Table 5 is recorded onto the DPE input area 24 of the track S1, and the developed negative film 10 and photographic paper 232 are returned the user.

The user can arbitrarily record the information for items 17, 18 and g through n of Table 2 onto the user input area 112 of the track T2 of each image frame 10A.

Here, the case that the negative film 10 is fed frame by frame and is not continually conveyed at a constant speed is described. In the normal conditions of an ordinary camera, each image frames 10A is conveyed at such a speed that about 80% of the entire conveying range of each image frame 10A can be used for recording. However, depending on the degree of the consumption of a battery incorporated within the camera 200 and the difference of the conveying speed, in some cases, caused by the differences between camera manufactures, it often happens that the time when the conveying speed reaches a speed capable of recording is delayed. On the contrary, it may also happen that the negative film 10 is conveyed quickly, and the information recording area has passed by recording heat 208 before all the information which was initially supposed to be recorded has been recorded. In such a case, according to conventional recording methods, the entire information for one track has not been recorded. However, in this embodiment, since the areas for the STX signal, the ETX signal and the CRC/ECC signal are each provided for each different recording track, the tracks may each be formed as an independent area. Consequently, even if a part of the information areas (for example, the third camera input area 124 of track T1) cannot be recorded, other parts of the information areas (for example, the first and second camera input areas 78, 83 of track T1) can be reliably recorded.

That is, even if there is unevenness in the conveying of the negative film 10, only the recording range (usually 80%) is narrowed. The inconvenience of not being able to utilize the information of the entire track does not occur.

Incidentally, in this embodiment, if the above-described error in conveying is present, since the unrecordable area is the rear portion of each track and the area for recording relatively important information is provided at the front portion of the track, the performance of the photo processing system does not deteriorate. Further, the advantage of using a magnetic track can be maintained. For example, it is not necessary to use a conventional memory card in the laboratory.

What is claimed is:

1. A photographic film on which an image to be photographed is optically recorded, comprising:
 a plurality of image frames; and
 a single recording portion provided in association with each one of said image frames for recording image information associated with said image frame, said recording portion including two or more contiguous fields running along a direction in which said photographic film is conveyed so that two or more sections of image information are recorded in said fields, each of said sections of image information consisting of a portion of said image information and provided with at least a corresponding start signal and a corresponding end signal.

2. A photographic film according to claim 1 wherein each of said image information sections is further provided with at least one of a corresponding error detection signal and a corresponding error correction signal.

3. A photographic film according to claim 2 wherein each of said fields is arranged such that said corresponding start signal, one of said sections of image information, said corresponding end signal and at least one of said corresponding error detection signal and said corresponding error correction signal are recorded on said fields in that order.

4. A photographic film according to claim 1 wherein said recording portion comprises at least one magnetic track formed on a magnetic recording layer provided on said photographic film.

5. A photographic film according to claim 4 wherein said magnetic track is formed at a portion of said photographic film so as not to be superimposed on said image frame.

6. A photographic film according to claim 4 wherein said magnetic track extends in a direction parallel to a longitudinal direction of said photographic film, and a length of said magnetic track is substantially the same as a length of said image frame as measured in the longitudinal direction of said photographic film.

7. A photographic film according to claim 1 wherein more important of said image information sections is recorded on a front field of said two or more fields, as viewed in a direction in which said photographic film is conveyed.

8. A photographic film according to claim 1 further comprising a second recording portion at a front end portion of said photographic film for recording film information relating to said photographic film.

9. A photographic film according to claim 8 wherein said second recording portion includes two or more second fields running along a direction in which said photographic film is conveyed so that two more film information sections, each consisting of a portion of said film information are each provided with at least a corresponding start signal, a corresponding end signal, and at least one of a corresponding error detection signal and a corresponding error correction signal.

10. A photographic film comprising:
a base;
an emulsion layer provided on one surface of said base for optically recording a photographed image in a plurality of image frames;
a substantially transparent magnetic recording layer provided on the other surface of said base for magnetically recording information; and
at least one magnetic track formed in association with each individual image frame on said magnetic recording layer and extending in a direction parallel to a longitudinal direction of said photographic film, said tracks each including two or more contiguous fields running along a direction in which said photographic film is conveyed so that two or more sections of information, which are recorded in one of said fields and consist of a portion of said information, are each provided with at least a corresponding start signal, a corresponding end signal, and at least one of a corresponding error detection signal and a corresponding error correction signal.

11. A photographic film according to claim 10 wherein more important of said information section is recorded on a front field of said two or more fields, as viewed in a direction in which said photographic film is conveyed.

12. A method of recording information on a photographic film for recording information relating to each image frame of said film on a recording portion provided in association with each one of said image frames, comprising the steps of:
(a) dividing information to be recorded on said recording portion into two or more sections of information; and
(b) recording each of said sections of information in a contiguous manner together with at least a corresponding start signal and a corresponding end signal for said each of said sections of information while conveying said photographic film.

13. A method of recording information on a photographic film according to claim 12, wherein said step (b) further comprises recording at least one of a corresponding error detection signal and a corresponding error correction signal together with each of said information sections.

14. A method of recording information on a photographic film according to claim 13, wherein during said step (b) said start signal, said sections of information, said end signal, and at least one of said error detection signal and error correction signal for said information are recorded in that order.

15. A method of recording information on a photographic film according to claim 12 wherein said step (b) begins after a perforation provided at a front end portion of each image frame is detected.

16. A method of recording information on a photographic film according to claim 12 wherein said recording portion comprises at least one magnetic track formed on a magnetic recording layer provided on said photographic film.

17. A method of recording information on a photographic film according to claim 16 wherein said magnetic track is formed at a position so as not to be superimposed with said image frames of said photographic film.

18. A method of recording information on a photographic film according to claim 12 wherein more important information of said divided information is recorded on a forward portion of said recording portion as viewed in a direction in which said photographic film is conveyed.

19. A method of recording information on a photographic film according to claim 12 wherein said information is recorded by a magnetic head provided in a photographing camera.

20. A photographic device having film on which an image to be photographed is optically recorded, comprising:
a plurality of image frame areas extending along the length of said film;
a data recording portion associated with each of said image frames, said data recording portions being contiguous and extending in a direction of transport of said film;
a plurality of start signals provided in each of said data recording portions; and a stop signal associated with each of said start signals.

21. A method of recording information on a recording track formed on photographic film, said recording track corresponding to an individual image frame formed on said film and positioned in an exposure position of a camera, said method comprising the steps of;

transporting said film in a first direction to displace said individual image frame from said exposure position and to place an adjacent image frame at said exposure frame;

recording said information on said recording track during said transporting step, said information being recorded as a plurality of sections of information arrayed in said first direction, each of said sections of information having a start signal and a stop signal associated therewith.

* * * * *